(12) United States Patent
Parr

(10) Patent No.: US 6,928,956 B2
(45) Date of Patent: Aug. 16, 2005

(54) SCOOP FOR CAT LITTER

(76) Inventor: Michael J. Parr, 41 Old English Lane, Thornhill, Ontario (CA), L3T 2V2

( * ) Notice: Subject to any disclaimer, the term of this patent is extended or adjusted under 35 U.S.C. 154(b) by 0 days.

(21) Appl. No.: 10/740,485

(22) Filed: Dec. 22, 2003

(65) Prior Publication Data

US 2004/0177816 A1 Sep. 16, 2004

Related U.S. Application Data

(60) Provisional application No. 60/440,354, filed on Jan. 16, 2003.

(51) Int. Cl.$^7$ ................................................. A01K 1/01
(52) U.S. Cl. ....................................... 119/166; 119/168
(58) Field of Search ................................. 119/166, 163, 119/165, 167; 209/233, 235, 396, 397; 171/111

(56) References Cited

U.S. PATENT DOCUMENTS

| | | | |
|---|---|---|---|
| 5,931,119 A | * | 8/1999 | Nissim et al. ............... 119/163 |
| 6,286,459 B1 | * | 9/2001 | Parr ............................ 119/166 |
| 6,568,348 B1 | * | 5/2003 | Bedard ........................ 119/166 |
| 6,763,782 B1 | * | 7/2004 | Kordelin ...................... 119/166 |
| 2003/0121834 A1 | * | 7/2003 | Greenberg ................... 209/235 |

* cited by examiner

Primary Examiner—Yvonne R. Abbott
(74) Attorney, Agent, or Firm—Bereskin & Parr

(57) ABSTRACT

A circular litter box having a scoop removal remounted in a scoop holder which is pushed around the sidewall of the box to scoop the box. The mounting mechanism for the scoop causes the scoop to assume a relatively vertical position during scooping, to minimize formation of a wave of litter in front of the scoop as it is rotated, but causes the scoop to assume a more horizontal position as the scoop is removed, so the collected waste will not spill from the scoop during removal.

13 Claims, 14 Drawing Sheets

SCOOP FOR CAT LITTER

PRIOR APPLICATION

This application claims the benefit of U.S. Provisional Application Ser. No. 60/440,354, filed Jan. 16, 2003 entitled "SCOOP FOR CAT LITTER".

FIELD OF THE INVENTION

This invention relates to an apparatus for guiding a scoop out of a circular litter box such that waste captured by the scoop, does not spill from the scoop, and to other aspects of litter boxes and litter box scoops.

BACKGROUND OF THE INVENTION

Scoops or sieves are commonly used for capturing and removing waste from a litter box.

Most scoops are handheld and separate from the litter box. Handheld scoops are used to randomly sift through the litter in search of waste. The person performing removes the waste filled scoop manually from the litter box.

Some scoops are incorporated into a litter box design and are not removable from the apparatus. The scoop may automatically or semi automatically move through the litter pushing the waste. U.S. Pat. No. 5,226,388 describes a litter box and scooping apparatus where at one end of the litter box the bottom curves upward such that scoop pushes the waste up the curve until the scoop is horizontal and will hold the waste independently. The scoop moves into position above a reservoir and then rotates down to deposit the waste. In U.S. Pat. No. 4,048,465 the waste is pushed up the upwardly curved bottom end of the litter box and then falls over the edge of the litter box into a storage reservoir.

Other litter boxes that have non-removable scoops include those where the scoop is fixed to the bottom of a drum shaped container. When the drum is rotated the scoop passes through the litter, capturing and retaining the waste while letting the litter pass through. As drum continues to rotate the waste is guided to a collection assembly and then to a waste reservoir. The waste reservoir can then be removed for discarding waste. U.S. Pat. No. 5,509,379 describes such a device.

U.S. Pat. No. 5,259,340 describes a device where a scoop rotates within a litter box, having a drum shaped interior, and captures waste as it passes through the litter. The scoop stops in a secondary position where waste may drop into a storage container to enable disposal.

Some scoops are incorporated into litter box design but are removable. U.S. Pat. No. 6,295,949 discloses a litter box where waste is captured by a scoop when the litter box is rotated ninety degrees into a secondary position. The scoop is then removed from the litter box and the waste is disposed of.

Other types of scoops include those that rest on the bottom of the litter box. U.S. Pat. No. 5,823,137 discloses a scoop, which rests on the bottom of a litter box and is hingedly attached to the upper lip of one end. This scoop captures waste when lifted upward. As the scoop continues upward, the waste slides down the scoop into storage reservoir. The scoop is not intended to be removed during scooping.

Some scoops contain movable features in order to remove waste from the litter box. U.S. Pat. No. 6,286,459 describes a litter container with rotary movement sieve. A scoop cleans the litter box while vertically oriented and then is hingedly able to horizontally reposition itself as it is removed from the litter box. In the horizontal orientation, the scoop is able to retain waste as it is removed from the litter box.

As litter box design has changed, so have scoop designs. A circular litter box with a rotary sieve or scoop requires new methods for inserting, positioning and removing a detachable scoop.

BRIEF SUMMARY OF THE INVENTION

It is an object of the present invention to provide a mechanism such that the waste collected by a removable scoop in a circular litter box does not fall out of the scoop as the scoop is removed from the litter box.

Unlike other litter boxes, a circular litter box presents itself as an endless container to a scoop that is radially rotated in the container. There is no end where the scoop completes its sieving. There is no or final removal point.

Additionally, any scoop rotated in the litter box will cause a "wave" of litter to build in front of the scoop. If this wave is too large some parts of waste can "surf in front and will not enter the scoop. Secondly, the wave could become high enough to disturb and interfere with the mechanism for attaching the scoop to the sidewall. Thirdly, the wave could possibly crest over the litter box. Fourthly, a large wave may decrease the random spread of litter in the container by agglomerating much of the litter in an area ahead of the scoop.

The size of the wave is determined by several factors. The greater the surface area of the scoop contacting the litter, the more litter is pushed, and the bigger the wave. The orientation of the scoop is also a factor. If part of the scoop is positioned more horizontally in the litter, the perforations of the scoop will tend to carry litter along during the scooping movement, building up the wave.

Therefore, the optimal position for a scoop sieving the litter container is a more vertical position. However, in this position the scoop cannot be lifted directly out of the container without waste spilling from the scoop.

Therefore, it is the object of this invention to present a mechanism that will guide the movement of a scoop as it is removed from a circular litter box such that collected waste is less likely to fall out of the scoop.

In one of its aspects the invention provides a circular litter container comprising: (a) a sidewall; (b) a scoop holder mounted on said sidewall for travel in a direction of travel around said sidewall; (c) a scoop; (d) a mounting mechanism for removably mounting said scoop on said scoop holder; (e) said mounting mechanism comprising cooperating mounting means on said scoop and said scoop holder for said scoop to have an operating position in which said scoop is oriented at a first angle relative to said direction of travel in which said scoop may be rotated through litter in said container while minimizing formation of a wave of litter piled in front of said scoop; (f) said cooperating mounting means including a guide such that as said scoop is removed from said scoop holder, the orientation of said scoop is redirected to a second angle nearer to the horizontal than said first angle, whereby to help retain collected waste on said scoop: (g) said container having a bottom and said scoop holder including a scraper bar mounted to scrape said bottom as said scoop holder is rotated in said container.

In another aspect the invention provides a mounting mechanism having a curved track built into the sidewall slider which guides the movement of the scoop in and out of the litter box in a forward and upward motion thereby retaining collected waste in the scoop.

In another aspect, the invention provides for a track built into the scoop unit, which slides along a track slider/pivot built into the sidewall slider. An additional guide track built into the sidewall slider directs the movement of the scoop unit in and out of the circular litter box such that it will assume forward and upward motion during scoop removal. Thereby, the waste collected in the scoop does not fall out.

In another aspect of the invention, a straight track is built into the sidewall slider, which guide the scoop out of the litter box in a forward and upward motion. Collected waste is retained in the scoop.

Further objects and aspects of the invention will appear from the following description, taken together with the accompanying drawings.

BRIEF DESCRIPTION OF THE DRAWINGS

FIG. 4A is a perspective view of the scoop carrier of FIGS. 1 to 4;

DETAILED DESCRIPTION OF THE PREFERRED EMBODIMENT

Figure 1:
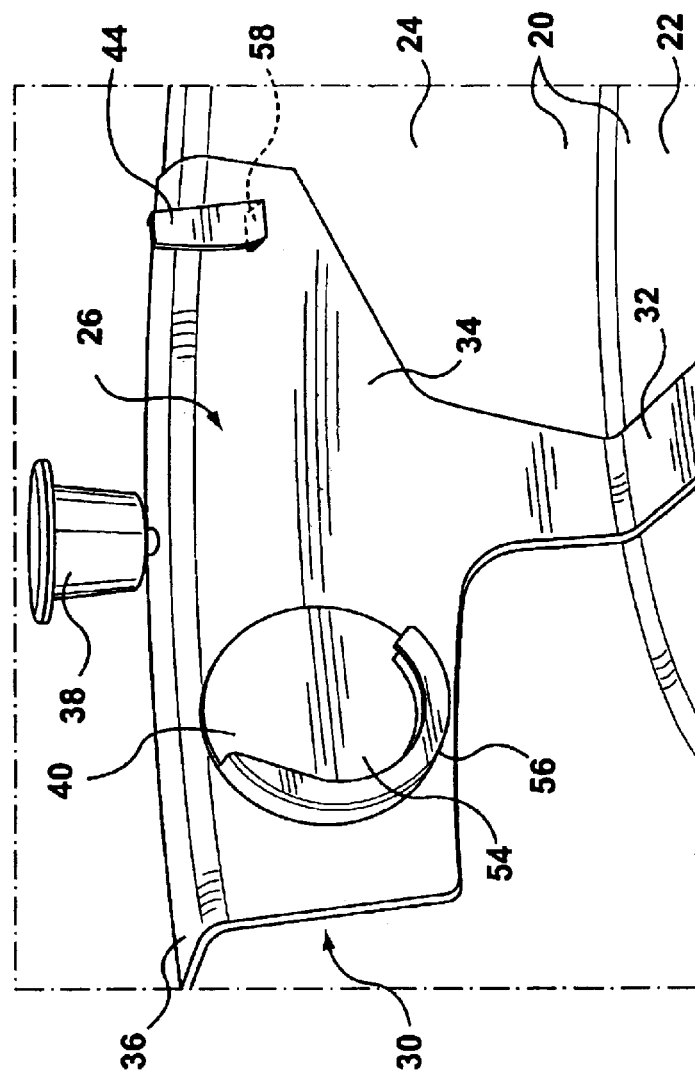
FIG. 1 is a perspective view of a portion of a litter container showing a scoop carrier according to the invention in position thereon.
Figure 2:
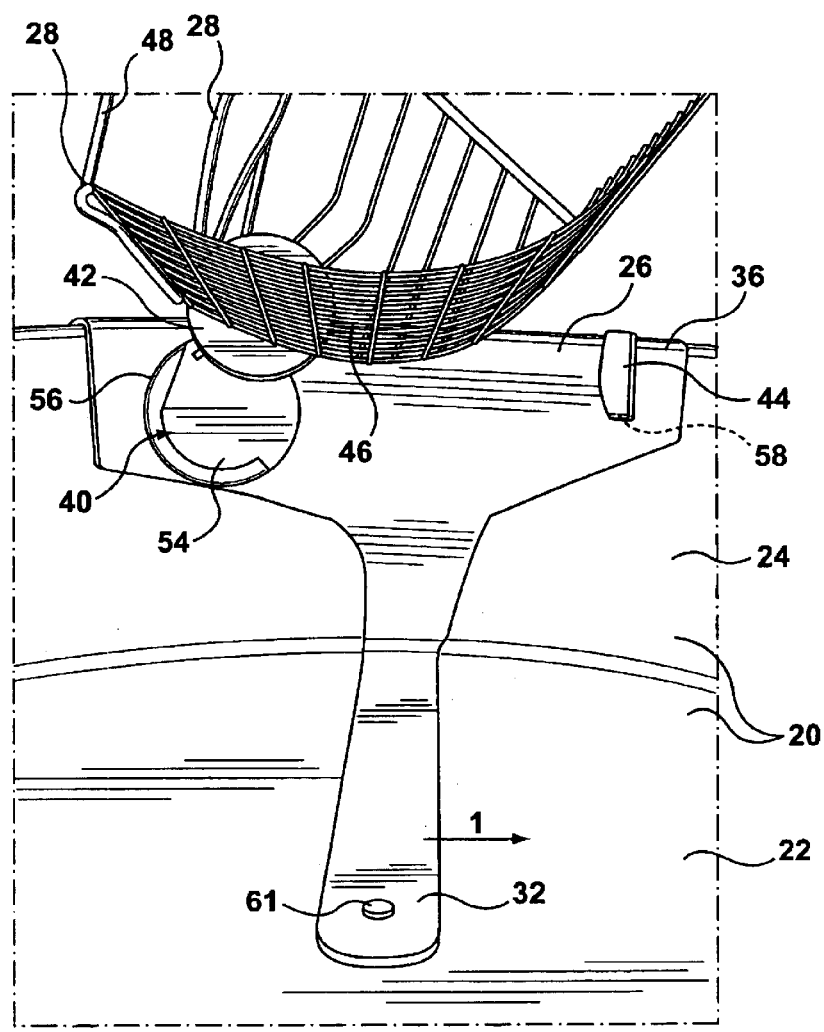
FIG. 2 is a view similar to that of FIG. 1 but showing a scoop unit about to be placed into the scoop carrier.
Figure 3:
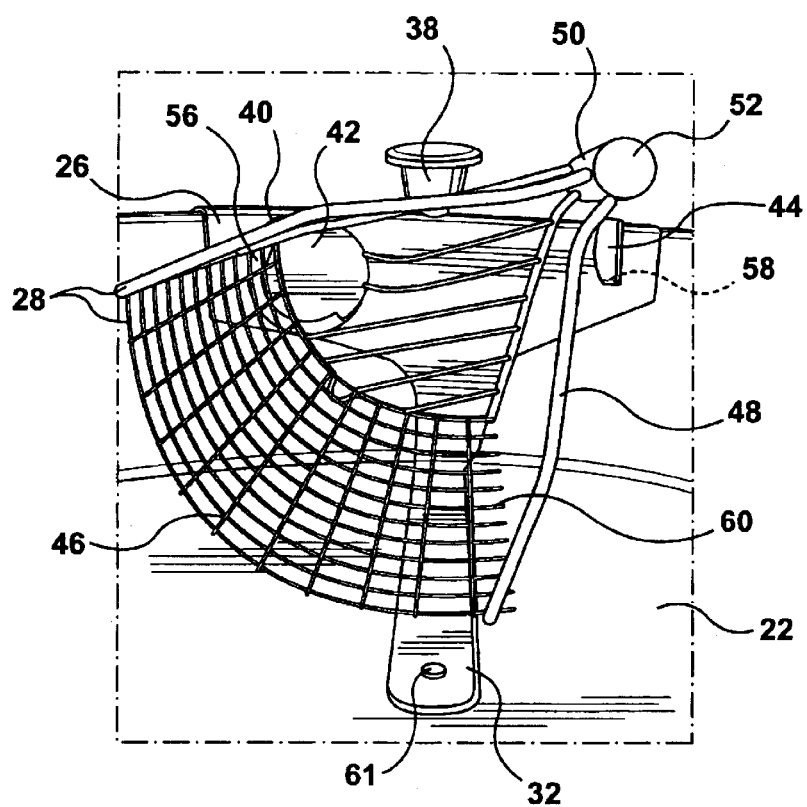
FIG. 3 is a perspective view similar to that of FIG. 2 but showing the scoop unit nearly in position on the scoop carrier.
Figure 4:
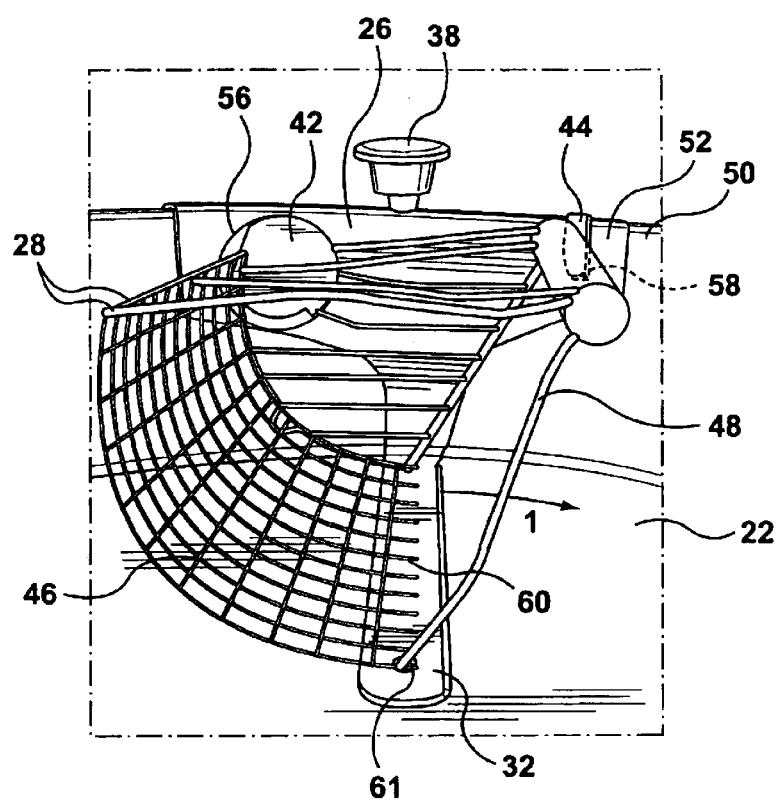
FIG. 4 is a perspective view similar to that of FIG. 3 but showing the scoop unit fully in position on the scoop carrier.

Reference is first made to FIGS. 1 to 4A inclusive, which show a litter container 20 according to the invention. The litter container 20 is a circular container having a flat bottom 22 and an upstanding sidewall 24 extending in a circle around the bottom 22.

Mounted on the sidewall 24 is a mounting mechanism or scoop carrier 26, which serves to support a scoop unit 28 and to carry the scoop unit 28 rotatably around the sidewall 24.

The scoop carrier 26 includes a sidewall slider 30 portion, which mounts on the sidewall 24, and a rigid bar 32, which extends radially inwardly from the sidewall slider 30 to approximately the center of the bottom 22. The sidewall slider 30 comprises a vertical wall 34 having a curved portion 36 at its top, which extends radially outwardly and downwardly to hook over the top edge of the container sidewall 24, to support the scoop carrier 26 on the rim of the container sidewall 24.

Projecting from the upper edge of the top wall of the scoop carrier is a post 38, which serves as a handle to grasp the scoop carrier 26 and to rotate it circumferentially around the periphery of the container sidewall 24.

The vertical wall 34 of the scoop carrier 26 includes a socket 40, which is circular in outline and is molded into the vertical wall of the scoop carrier 26. The socket 40 is dimensioned to accept a matching male plug 42 on the scoop unit 28 as will be described.

At the front upper end of the vertical wall 34 of the scoop carrier 26, there is a radially inwardly projecting, vertically oriented U-shaped channel 44 (FIG. 4A), which accepts a leading portion of the scoop unit 28, as will also be described.

The rigid bar 32, which extends radially inwardly from the bottom of the scoop carrier 26, includes at its radially inner end an opening. A pivot pin 61 extends through the opening and through the bottom of the litter container 20 to secure the rigid bar 32 to the flat bottom 22 of the litter container 20 and to act as a pivot about which the scoop carrier 26 rotates when the user grasps the post 38 to rotate the scoop carrier 26.

The scoop unit 28 includes a scoop portion 46 preferably formed from mesh having openings of a suitable size for sieving cat litter in the container 20. The scoop portion 46 is concave as viewed from the direction of its rotation (indicated by arrow 1) in the container 20.

Fixed to the scoop portion 46 is a supporting frame 48 (made for example from metal rods) extending forwardly from the scoop portion 46. The plug 42 which is of circular disk shape, will be seen to be located at the rear radially outer and upper corner of the junction between the supporting frame 48 and the scoop portion 46.

At the forward end of the scoop unit 28 there is located a generally radially oriented handle 50, to which the frame members are secured. The handle 50 serves as a handle, which the user may grasp when inserting and removing the scoop unit 28 from the litter container 20.

At the radially outer junction of the supporting frame 48 with the handle 50 there is located a forwardly extending flange 52 (constituted by a bent portion of part of the frame). The flange 52 fits into the U-shaped channel 44 as will be described, to help lock the scoop unit 28 to the scoop carrier 26.

The rear socket 40 (FIG. 4A) includes a vertical circular wall 54 and a circular flange 56 extending around approximately 180 degrees, having an opening facing forwardly and slightly upwardly. The circular flange 56 extends radially inwardly by a width which is slightly greater then the thickness of the plug 42, and when the plug 42 is inserted in the socket 40, the radially inner edge 57 of the circular flange 56 covers part of the outer circumference of the plug 42, thereby locking the plug 42 securely within the socket 40 against sideways movement of the plug 42. The combination of the fit of the plug 42 within the socket 40, and the fit of the flange 52 within the U-shaped channel 44, holds the scoop unit 28 securely but removably to the scoop carrier 26. Flange 56 includes drainage openings 59 to allow any litter granules trapped in the flange 56 to escape.

The mechanism described operates as follows. When the user wishes to insert the scoop unit 28 into the scoop carrier 26, the user holds the scoop unit 28 by the handle 50 and inserts the plug 42 into the socket 40, with the flange 52 located above the U-shaped channel 44. The user then will move the handle downwardly so that the flange 52 enters the U-shaped channel 44. Continued downward movement of the flange 52 is limited by a bottom wall 58 in the U-shaped channel 44, which functions as a stop, so that the scoop unit 28 is thus locked securely into the scoop carrier 26.

The user then grasps the post 38 on the scoop carrier 26 and rotates the scoop carrier 26 in the direction of arrow around the sidewall 24. This carries the scoop unit 28 through the litter in the container 20, so that the scoop portion 46 will sieve the contents of the container 20.

The rigid bar 32 built into the scoop carrier 26 has several uses. It serves to stop further downward movement of the scoop unit 28 while providing support for the scoop portion 46 and scoop unit 28 when in scooping position. It also importantly aids the scoop portion 46 by removing a portion of the stress that the scoop portion 46 and scoop unit 28 would normally experience if the rigid bar 32 did not exist. When the scoop unit 28 is rotated to scoop the litter container 20, the rigid bar 32 will be the first object to encounter litter clumps that have become stuck to the bottom or side of the litter container 20. Clumps commonly become stuck to the flat bottom 22 when clumping litter is used. As the rigid bar 32 is structurally very durable, and is supported well at both ends, it easily dislodges the stuck clumps. If the rigid bar 32 were absent, the scoop unit 28 would have to be built more durably as the scoop portion 46 would have to knock stuck clumps off the flat bottom 22. Additionally, the scoop unit 28 could be more easily broken as it would only be supported at one end, whereas the rigid bar 32 is supported at both ends.

After the scoop unit 28 has been rotated in the litter container 20 to collect litter clumps, it must be removed from the container 20 for emptying. During removal, the scoop unit 28 follows the reverse motion to that used when it was inserted. When the handle 50 is pulled upwardly, the leading edge 60 of the scoop portion 46 rotates upwardly and forwardly as the flange 52 is pulled up and out of the U-shaped channel 44. The forward and upward rotation of the scoop unit 28 keeps waste, which has been pushed onto the scoop portion 46, in position on the scoop portion 46.

As the handle 50 continues to be pulled upwardly, and as the flange 52 emerges from the U-shaped channel 44, the plug 42 moves forwardly and upwardly out of the socket 40. The scoop portion 46 becomes positioned in a generally horizontal position so that the collected clumps cannot fall from the scoop portion 46 (but loose litter granules will fall through the openings between the mesh of the scoop portion 46 and will be returned to the container).

DETAILED DESCRIPTION OF A SECOND EMBODIMENT

Figure 5:
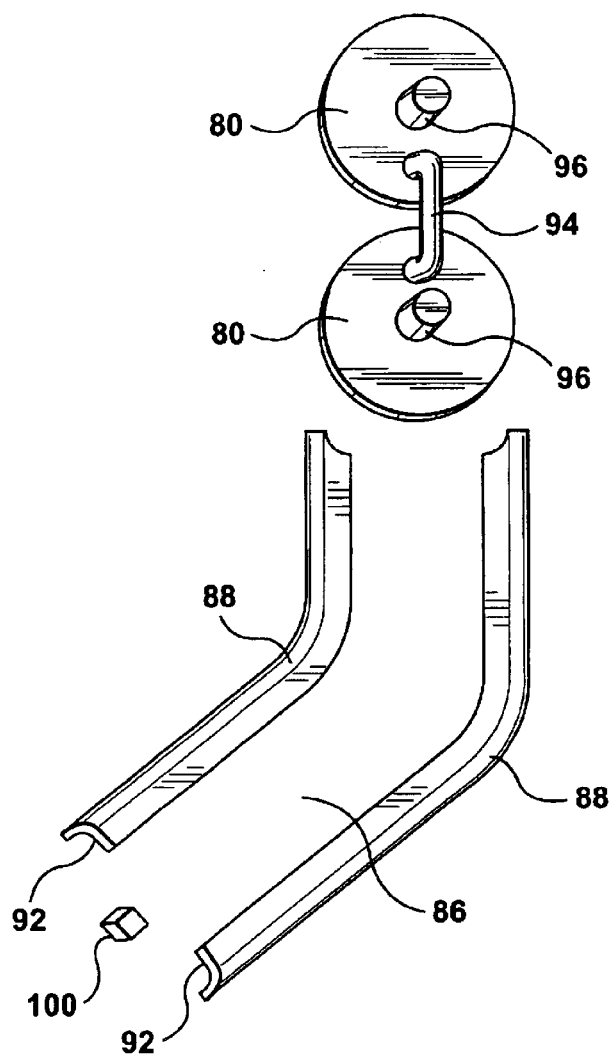
FIG. 5 is a diagrammatic view of disk units and a guide track for an alternative method of mounting a scoop unit on a scoop carrier.
Figure 6:
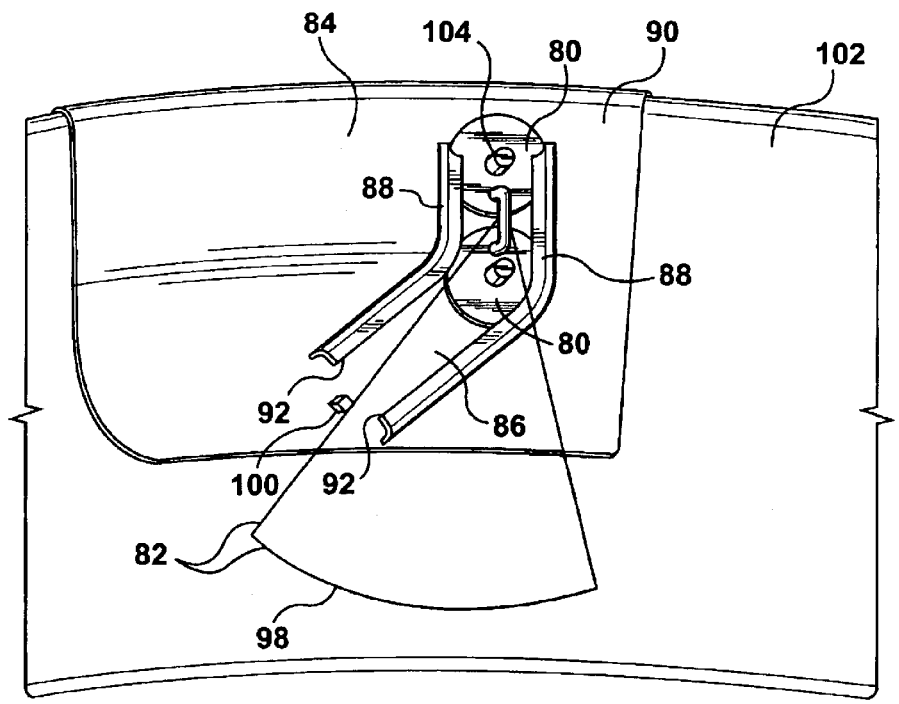
FIG. 6 is a plan view showing the mechanism of FIG. 5 on a scoop carrier in position on a container wall.
Figure 7:
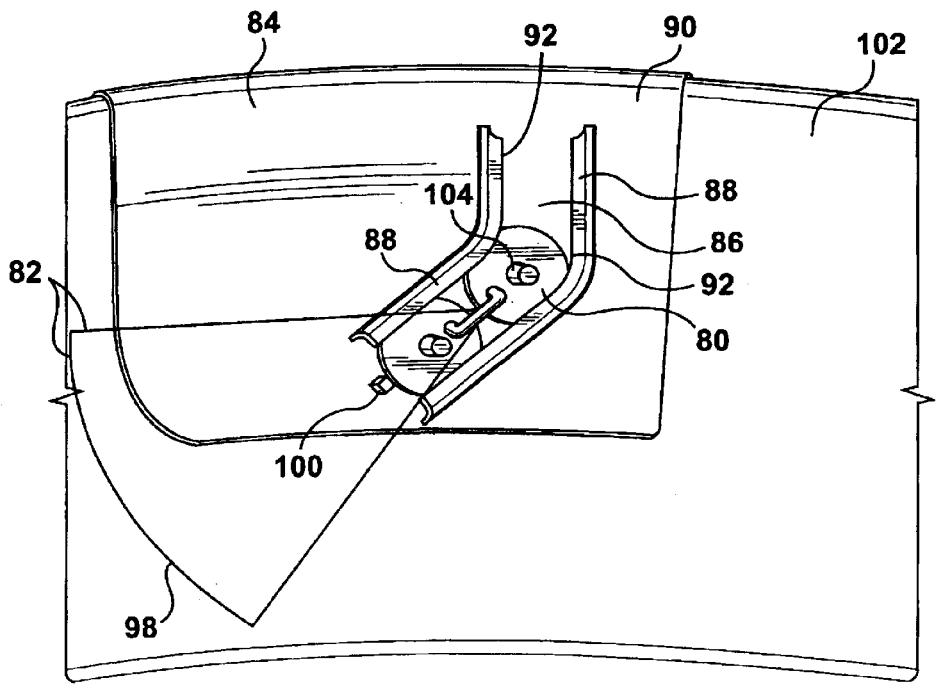
FIG. 7 is a view similar to that of FIG. 6 but showing the disks further down the guide track.

Reference is next made to FIGS. 5 to 7, which show a second embodiment of the invention The second embodiment differs from the first embodiment in that the plug and socket 42, 40 and the flange and channel 52, 44 of the first embodiment have been removed and been replaced in part by two circular disks 80 at the radially outer end of the scoop unit 82 which provide a two point support for the scoop unit 82 on the scoop carrier 84, as will now be described. In addition the rigid bar 32 has been eliminated in this second embodiment.

In particular the second embodiment includes a guide track 86, consisting of a pair of spaced L-shaped rails 88, which protrude radially inwardly from the inward wall 90 of the scoop carrier 84, and have outer flanges 92 protruding towards each other. The two circular disks 80 are secured at vertically spaced locations on the radially outer edge of the scoop unit 82 and fit into the guide track 86. The two circular disks 80 are attached together by a join piece 94 such that the position of each disk 80 relative to one another cannot change. Each disk 80 has an attachment member 96 protruding from its center, which integrally connects each disk 80 to the Scoop Unit 82. In the drawings the join piece 94 is illustrative and may not be needed, as each disk 80 will be fixed in place relative to one another when molded to the side of the Scoop Unit 82.

FIG. 6 shows the disks 80 of Scoop Unit 82, placed into the top of the guide track 86. As will be apparent from FIG. 6, when the circular disks 80 are near the top of the guide track 86, the scoop portion 98 of the scoop unit 82 is held in a generally horizontal position.

As shown in FIG. 7, as the scoop unit 82 is pushed downward, the rearward curve of the Guide Track 86 guides the disks 80, and hence the Scoop Unit 82, backwards until the scoop portion 98 reaches scooping position. At this point a stop member 100 in the middle of the Guide Track 86 blocks the circular disks 80 and prevents further downward and rearward movement of the scoop unit 82. The Scoop Unit 82 is ready for travel in the litter container 102.

After scooping and capturing waste, the Scoop Unit 82 is ready for removal from the litter container 102. The Scoop Unit 82 is pulled upward by its handle 104. The movement and positioning of the scoop Unit 82 and the scoop portion 98 is the reverse of when inserted into the guide track 86. The scoop portion 98 moves forward against the litter and upward therefore retaining the captured waste within the scoop portion 98.

In this embodiment a rigid bar 32 is not shown in order to simplify the illustration of the mechanisms, which mount the scoop unit 82. Although not shown, it is preferable to utilize a rigid bar 32 that would function as described in the first embodiment.

DETAILED DESCRIPTION OF A THIRD EMBODIMENT

Reference is next made to FIGS. 8 to 11, which show a third embodiment of the invention. The third embodiment differs from the previous embodiment in that a scoop track 130 is built into the Scoop Unit 132.

Figure 8:
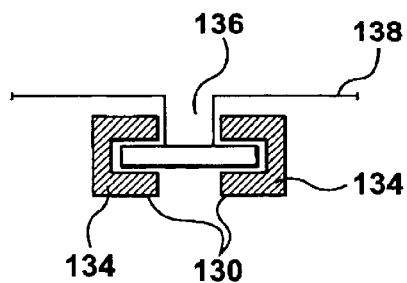
FIG. 8 is a sectional view showing an alternative guide track and disks for mounting a scoop unit on a scoop carrier.

The scoop track 130 comprises a pair of U-shaped channels 134 having their open ends facing each other, shown as cross section in FIG. 8. The U-shaped channels 134 can be built into and form part of the radially outer vertical wall structure of the scoop unit 132.

The scoop track 130 mounts onto a track slider/pivot 136, which as shown is secured to and projects radially inwardly from the vertical sidewall 138 of the scoop carrier 140.

Figure 9:
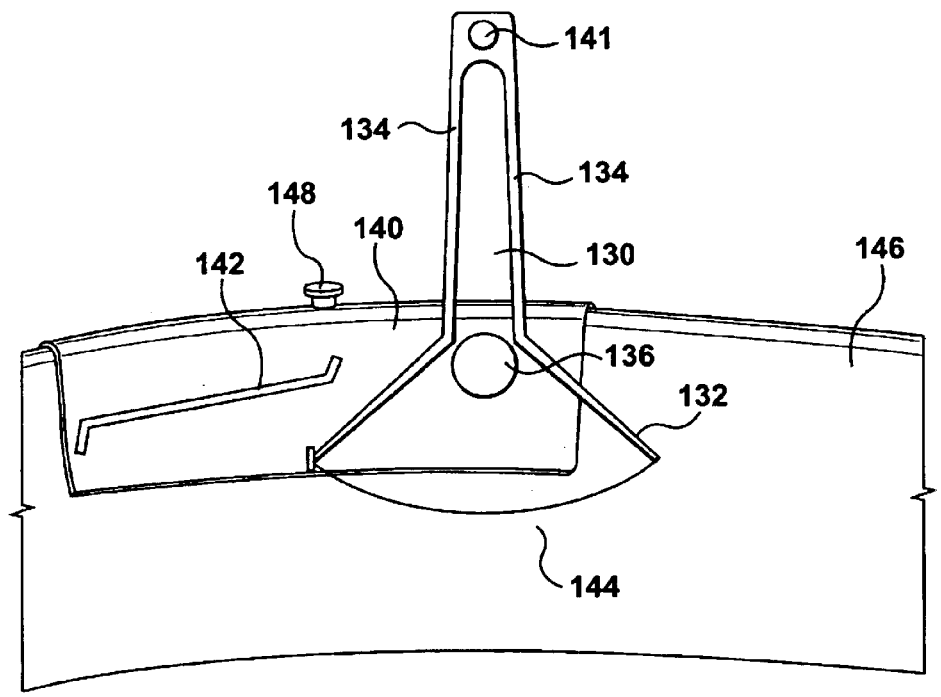
FIG. 9 is a plan view showing the guide track of FIG. 8 in position to be mounted on a scoop carrier.
Figure 10:
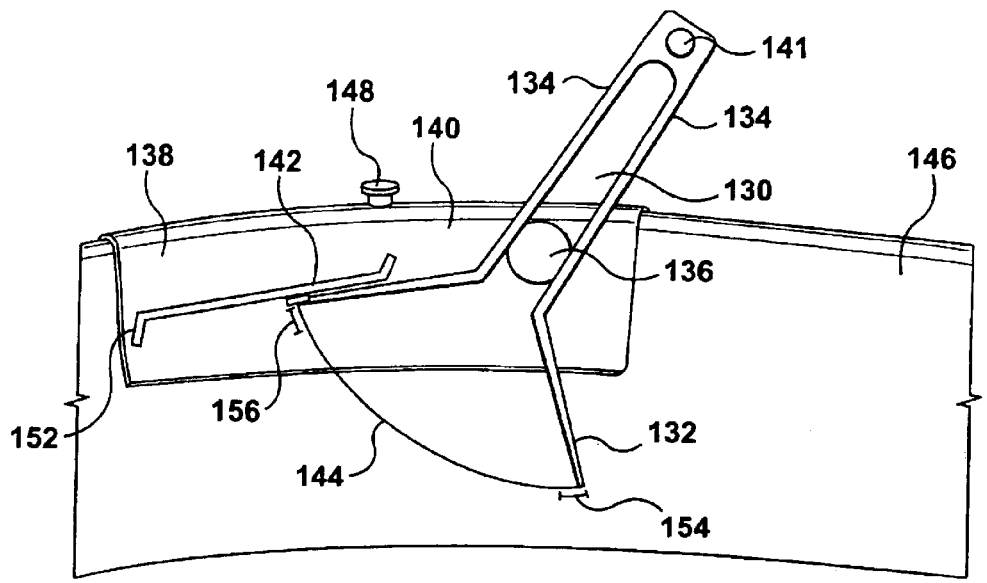
FIG. 10 is a view similar to that of FIG. 9, but showing the scoop unit further in mounting position on the scoop carrier.

As shown in FIG. 9, the two U-shaped channels 134 flare outwardly away from each near the bottom of the scoop unit 132, so that the scoop unit 132 can be moved against sidewall 138 and then downwardly for the track slider/pivot 136 to enter the scoop track 130 formed by the two U-shaped channels 134. As the scoop unit 132 continues to move downwardly, the user pushes the handle 141 of the scoop unit 132 forward. This causes the scoop portion 144 to pivot rearwardly, as shown in FIG. 10 at which point the rear end of the scoop portion 144 rotates upwardly against a guide rail 142 mounted on the vertical sidewall 138 of the scoop carrier 140, preventing further upward pivoting of the scoop portion 144.

At this time, the user can release the handle 141 and begin rotating the scoop unit 132 in the litter container 146 by using the post 148 on the scoop carrier 140.

Figure 11:
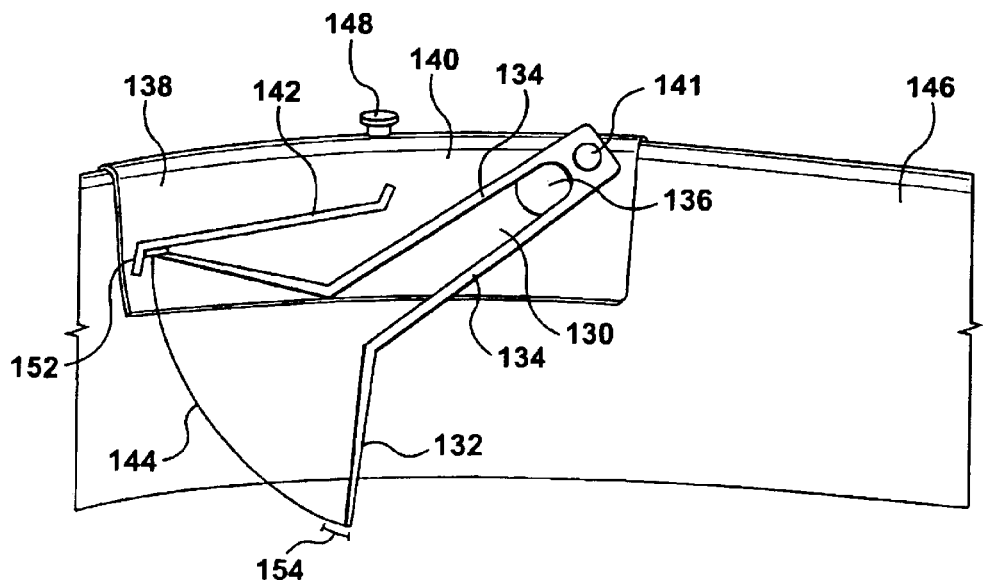
FIG. 11 is a plan view similar to that of FIG. 10, but showing the guide track for the scoop unit fully mounted in position on the scoop carrier.

As the scoop unit 132 begins to move, the force of the litter against the scoop portion 144 cause the scoop unit 132 to move backwards. The upper and rear portion of the scoop portion 144 slides rearwards along the guide rail 142 until it reaches a stop member 152 that prevents further rearward movement. The scoop unit 132 is now in its final scooping position, as shown in FIG. 11.

After the scoop portion 144 has collected waste, the scoop unit 132 can be removed. As the handle 141 on the scoop unit 132 is pulled upward, the leading edge portion 154 of the scoop portion 144 begins to move forward and upward thus retaining captured waste in the scoop portion 144.

In this embodiment a rigid bar 32 is not shown in order to simplify the illustration of the mechanisms. Although not shown, it is preferable to utilize a rigid bar 32 that would function as described in the first embodiment.

DETAILED DESCRIPTION OF A FOURTH EMBODIMENT

In the embodiments previously described the mounting mechanisms not only cause the scoop to be removed in a forward and upward movement, but also these mechanisms also cause the scoop to change orientation, as the scoop unit is inserted and removed from the litter container. In scooping position, the scoop is in more of a vertical orientation. As discussed previously, this vertical orientation means less surface area of the scoop contacts the litter in a plane at right angles to the direction of rotary movement of the scoop. Less surface area results in a smaller wave in front of the scoop meaning waste more readily flows into the scoop. However, if desired, a scoop that does not change orientation as it is inserted and removed can be used. In this version more surface area of the scoop will contact the litter, therefore this version is not preferred.

Figure 12:
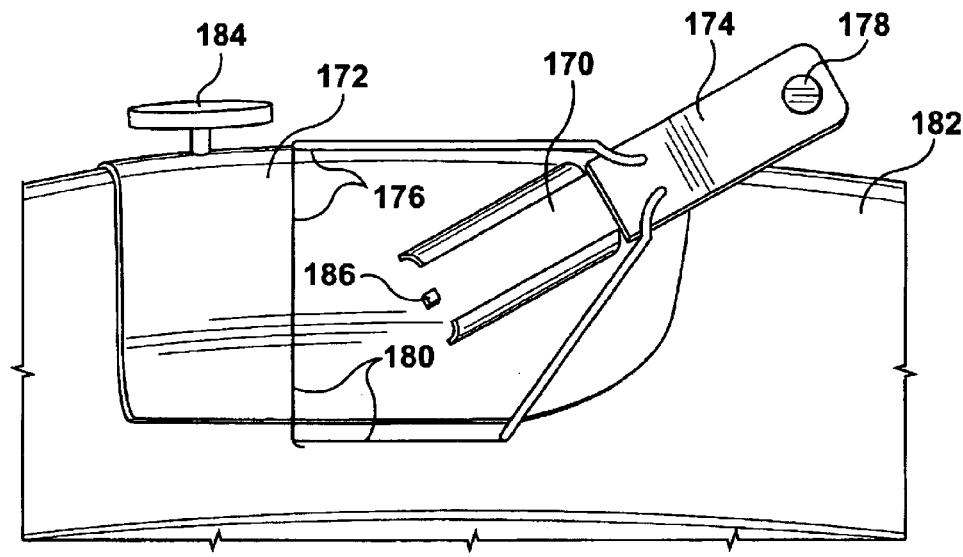
FIG. 12 is a plan view showing another embodiment of a guide track on a track slider for mounting a scoop unit on a scoop carrier.
Figure 13:
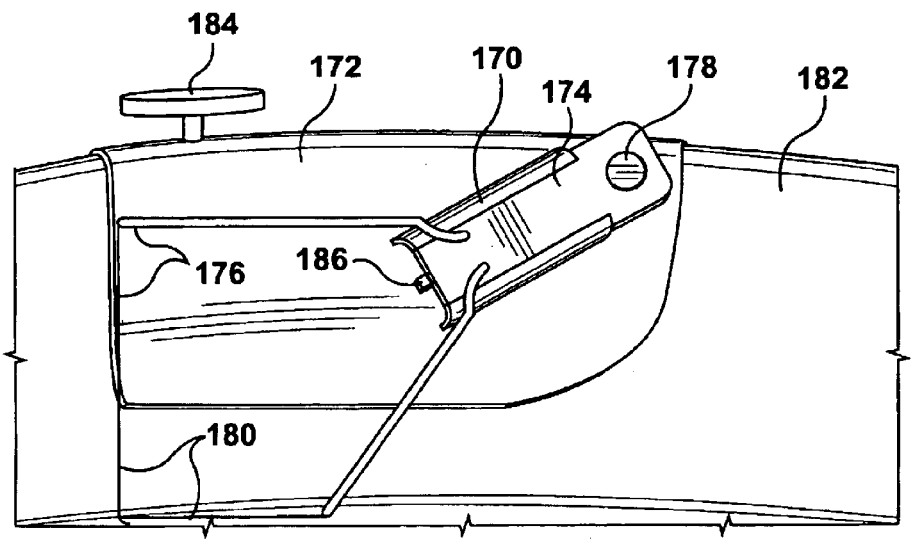
FIG. 13 is a plan view similar to that of FIG. 12 showing the guide track and track slider fully mounted on the scoop carrier.

Reference is made to FIGS. 12 and 13, which show a straight track 170, molded into the scoop carrier 172. A rectangular track slider 174 is built into the side of the Scoop Unit 176 and fits into the straight track 170. Both Figures show the scoop unit 176 as cutaway to reveal the portion of the scoop unit 176 which is adjacent to the scoop carrier 172.

FIG. 12 shows the scoop unit 176 as the track slider 174 is about to be inserted into the straight track 170. The person using the litter container 182 inserts the scoop unit 176 onto the straight track 170 using the handle 178 of the scoop unit 176. The scoop unit 176 is pushed down (the track slider 174 moving downward in the straight track 70) until the scoop portion 180 reaches the surface of the litter. At this point the user can begin to rotate the scoop unit 176 within the litter container 182 using the post 184 that is attached to the top of the scoop carrier 172. The force of the litter against the scoop portion 180 causes the scoop unit 176 to move rearward and down the straight track 170 until the track slider 174 comes to rest against a stop piece 186 that protrudes outwardly into the middle of straight track 170.

FIG. 13 shows the Scoop Unit 176 in scooping position where the track slider 174 has come to rest against the stop piece 186.

After the scoop portion 180 has captured waste in the litter container 182, the scoop unit 176 is removed by utilizing the handle 178 to pull the scoop unit 176 and track slider 174 out of the straight track 170. The scoop portion 180 moves forward against the litter and upward thus retaining the captured waste in the scoop portion 180.

In this embodiment a rigid bar 32 is not shown in order to simplify the illustration of the mechanisms. Although not shown, it is preferable to utilize a rigid bar 32 that would function as described in the first embodiment.

DETAILED DESCRIPTION OF A FIFTH EMBODIMENT

Figure 14:
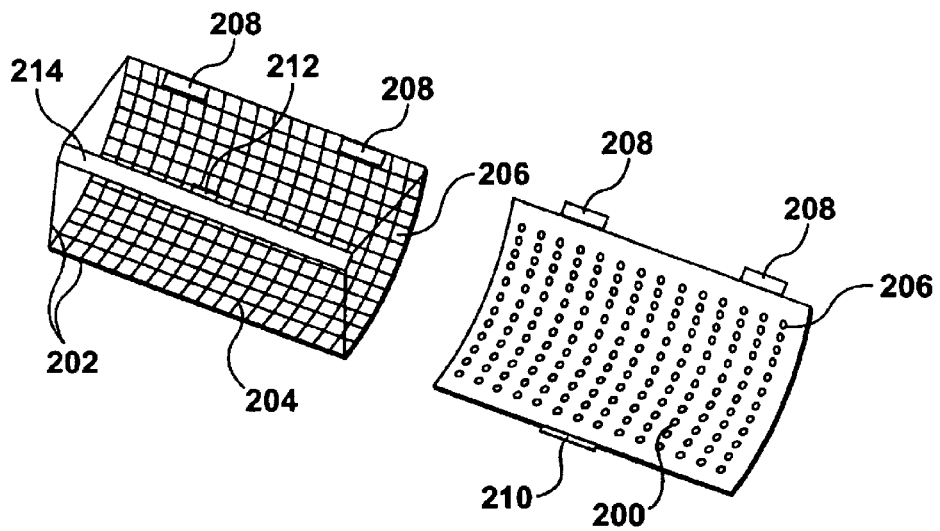
FIG. 14 is a perspective view of a scoop and a scoop change piece detached from the scoop unit.
Figure 15:
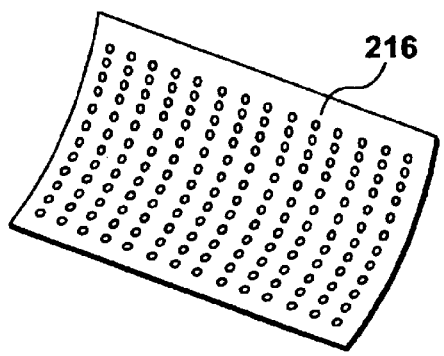
FIG. 15 is a perspective view of a disposable scoop change piece with circular perforations.
Figure 16:
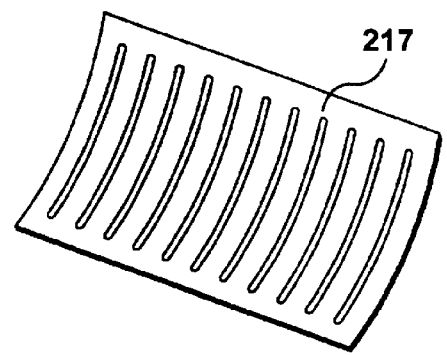
FIG. 16 is a perspective view of a disposable scoop change piece with slanted perforations.

Scoops work by having gaps, holes or slats which are intended to be large enough to let litter granules pass through, but small enough to capture and hold waste. A scoop with smaller perforations cleans better, but the trade off is that it takes longer for the litter to pass through the smaller perforations. It takes longer to clean the litter box, and this is less convenient for the person doing the scooping. Most scoops are designed to clean with some degree of speed. Therefore, it is common for small bits of waste to pass through the scoop. The result is a litter box that looks unclean and stays unclean until the entire contents of the litter box are changed. FIGS. 14 through 16 refer to a device for resizing the perforations in a scoop to enable a second grade of cleaning. The first stage of cleaning is done with the standard sized perforations. The second stage would be done utilizing a scoop change piece to create smaller sized perforations, which would enable a more thorough cleaning of the litter container.

As shown in FIG. 14 the scoop unit 202 is modified with a scoop change piece 200. The scoop change piece 200 is shown detached from the scoop unit 202.

The scoop change piece 200 made of flexible plastic and is shaped to match and to lay on the inside surface of the scoop portion 204. The scoop change piece 200 has perforations 206 that are much smaller than those on the scoop portion 204. These small perforations 206 on the scoop change piece 200 are able to retain waste that would have passed through the perforations 206 on the scoop portion 204. Granules of litter that are able to pass through the scoop change piece 200 also pass through the scoop portion 204. When the scoop change piece 200 is in position on the scoop portion 204, and passes through the litter, the flexible plastic of the scoop change piece 200 easily deforms to lay flush against the scoop portion 204.

Two hinges 208 connect the scoop portion 204 to the scoop change piece 200. The hinges 208 are located on each upper end of the scoop portion 204 and allow the scoop change piece 200 to be rotated upward such that the lower edge 210 of the scoop change piece 200 can be docked under a catch member 212 that is molded into the handle 114 of the scoop unit 202.

In this embodiment the scoop change piece 200 is built into the scoop unit 202. If desired the scoop change piece 200 may be made as a disposable scoop change piece 168 as shown in FIGS. 15 and 16. The disposable scoop change piece 168 is designed to be inserted into the scoop unit 202, used, and then discarded.

FIG. 15 shows a disposable scoop change piece with circular perforations, while FIG. 16 shows a disposable scoop change piece with slotted perforations.

DETAILED DESCRIPTION OF A SIXTH EMBODIMENT

FIG. 17 through 20 refer to a handheld scoop 250 that is able to resize its perforations to enable a coarse and a fine level of cleaning. The parts of this scoop will next be described.

As shown in the figures the scoop portion 252 consists of two plastic sieves. Each sieve is designed in a grid pattern with square openings. Each opening is 1 centimeter by 1 centimeter. The width of the plastic grid work is 2 centimeters.

The top sieve 256 has a length and width approximately 7 mm shorter then those dimensions of the bottom sieve 258. The thickness of the top sieve 256 is approximately 1.5 mm. Molded on an end of the sieve is a upper bridging portion 260 which extends outwardly at the same plane as the top sieve 256. The upper bridging portion 260 is 3 cm in length and tapers inwardly at its end. The upper surface of the upper bridging portion 260 contains a thumb-operated post 262, the operation of which will be described later.

Molded on the bottom of the upper bridging portion 260 is a slide member 264 that protrudes downwardly ⅔ cm. The slide member 264 is rectangular in shape and approximately 1 cm in length. On either side of the slide member 264, at the bottom center, are outwardly protruding bumps 266, the purpose of which will be later described. The slide member 264 is molded at a 45 degree angle relative to the grid work of the top sieve 256 as shown in FIG. 19.

The bottom sieve 258 has dimensions approximately 10 cm by 10 cm. As the bottom sieve 258 is the load-bearing portion of the scoop 250, it is approximately 6 mm thick. Although not shown in the figures, the two side edges of the bottom sieve 258 will normally have molded upwardly protruding sidewalls the purpose of which is to keep captured waste from falling out of the scoop 250. The bottom sieve 258 has a lower bridging portion 270 that extends outwardly and tapers to become a handle 272. The lower bridging portion 270 contains a channel 274 that is ⅔ cm deep and shaped to accept and contain the slide member 264. The channel 274 is 1.607 cm in length and is molded at a 45 degree angle relative to the grid work of the bottom sieve 258. The channel 274 also contains a groove 276 on either side near its the bottom such that the slide member 264 will snap fit into the channel 274 when the bumps 266 enter the groove 276. The grooves 276 also contain a set of two indentations 278 on each side such that the slide member 264 will snap securely at each indentation 278. The two sets of indentations will correspond to position 1 and to position 2. A detailed transparent view of the slide member 264 and channel 274 is shown in FIG. 18.

Figure 19:
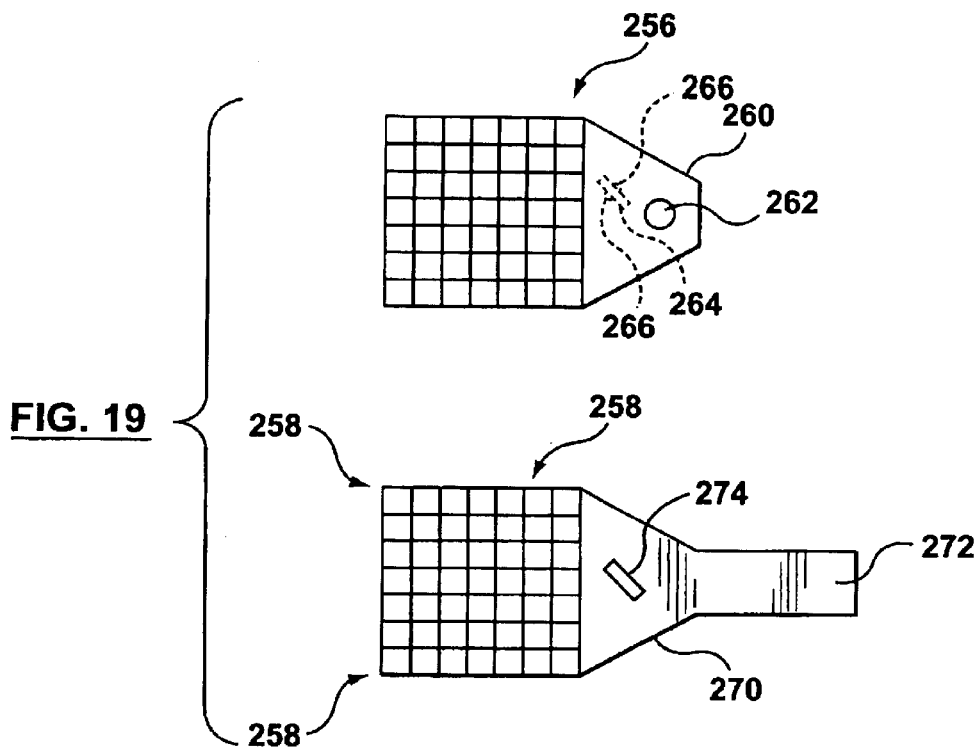
FIG. 19 is a top plan view of the scoop and a second sized sieve which can be connected together.

FIG. 19 shows an overhead exploded view of both the top sieve 256 and the bottom sieve 258 showing the placement of the channel 274 and the slide member 264.

Figure 17:
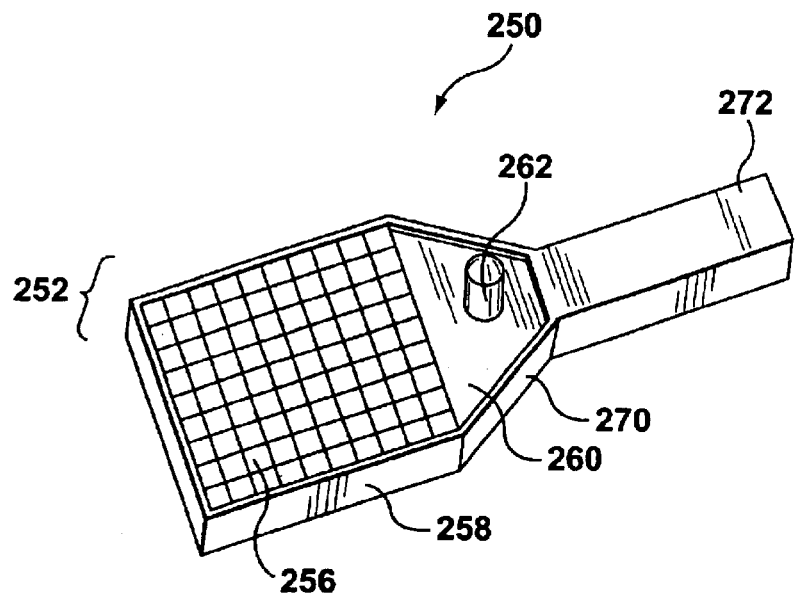
FIG. 17 shows a handheld scoop, which may be resized.

As shown in FIG. 17, in normal operation the top sieve 256 lays directly on top of the bottom sieve 258. This is position 1. In position 1 the apparent size of the openings of the scoop is 1 cm×1 cm, which corresponds to stage 1 or a coarse level of scooping.

Figure 18:
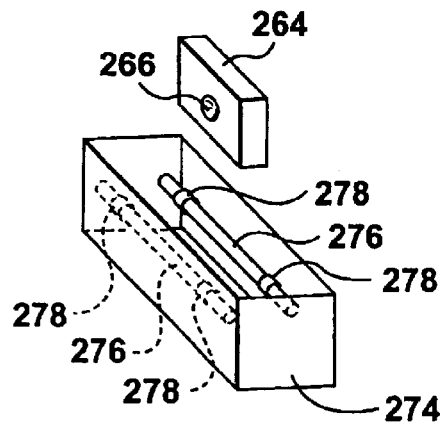
FIG. 18 shows a mechanism for connecting a different sized sieve to the scoop of FIG. 17.

FIG. 18 shows the mechanism which connects the two sieves together. The two sieves are connected together by the slide member 264, which is snap fit into the channel 274. When the bumps 266 on the slide member 264 are secured in the indentations 278 corresponding to position 1, the openings and plastic portions of each sieve's grid work match one another. In position 1 the apparent size of the of the openings of the scoop is 1 cm×1 cm, which corresponds to stage 1 or a coarse level of scooping.

Next described is how the scoop is altered to present a second stage of cleaning.

Figure 20:
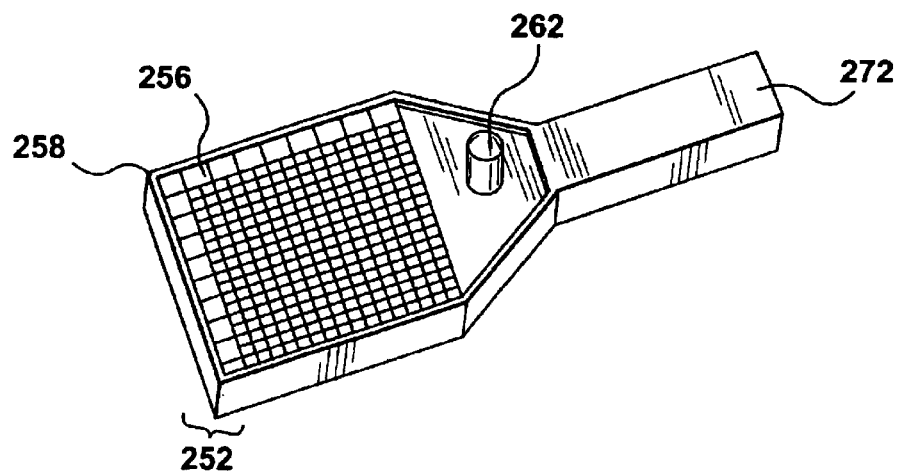
FIG. 20 is a perspective view the scoop of FIG. 19 after the size of the sieve has been altered.

The thumb post 262 of the top sieve 256 is used to move the slide member 264 in the channel 274 rearwards and sideways until the bumps 266 snap into the two indentations 278 corresponding to position 2. This movement also slides the top sieve 256 rearwardly and sideways by approximately 0.607 centimeters. When this occurs the "apparent" number of square perforations of the scoop portion 252 as viewed from above increases by four times, while the apparent size of the perforations decrease by approximately fourfold. FIG. 20 shows the scoop 250 with the top sieve 256 in position 2 as viewed from above.

The scoop can now be used to provide a second level of cleaning, which is much finer then the first level of cleaning.

DETAILED DESCRIPTION OF A SEVENTH EMBODIMENT

Many cat owners desire a cover for their litter box. A covered litter box provides several benefits. A cover helps contain the odor in the litter box. Some cat owners believe that their cats desire the privacy of a cover when they defecate. A cover also helps to hide the dirty contents of the litter box from view. A cover also helps keep litter from being kicked out of the litter box by the cat. One of the major disadvantages of a cover is that it must be removed in order to scoop out the waste from the litter box, and then replaced after scooping is completed. This embodiment provides a mechanism where scooping of the litter box is provided by rotating the cover, as it sits atop the litter box.

Figure 21:
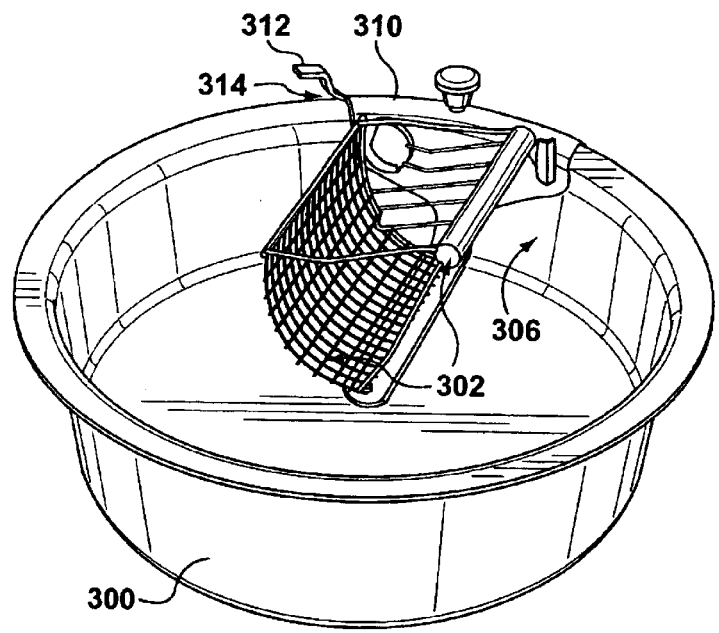
FIG. 21 is a perspective view of a scoop and litter container suitable for receiving a cover.

The relevant parts of the cover and litter container will now be described. Reference is made to FIGS. 21 to 24. FIG. 21 shows the litter container 300 with the scoop unit 302 mounted on the sidewall slider 304, and in scooping position. Scoop unit 302 and sidewall slider 304 are of substantially the same design as in FIGS. 1 to 4A. The sidewall slider 304 is mounted on the container sidewall 306 of the container 300. The interior diameter of the container sidewall 306 at its top is approximately 19 inches. The container sidewall 306 includes an outwardly extending lip 308 as shown. The sidewall slider 304 mounts on the container sidewall 306 and over the extending lip 308. The top wall 310 of the sidewall slider 304, which extends horizontally over the extending lip 308, is approximately 10 inches in length. The sidewall slider 304 has a cover-locking tab 312 molded onto its top horizontal surface at its trailing end 314, in reference to the direction the sidewall slider 304 is normally rotated when scooping. The cover-locking tab 312 extends upward approximately ⅔ inch and then rearwardly, extending approximately ¾ inch past the end of the sidewall slider. The purpose of the cover-locking tab 312 is to accept the rim 316 of the cover 318 as will later be described.

Figure 22:
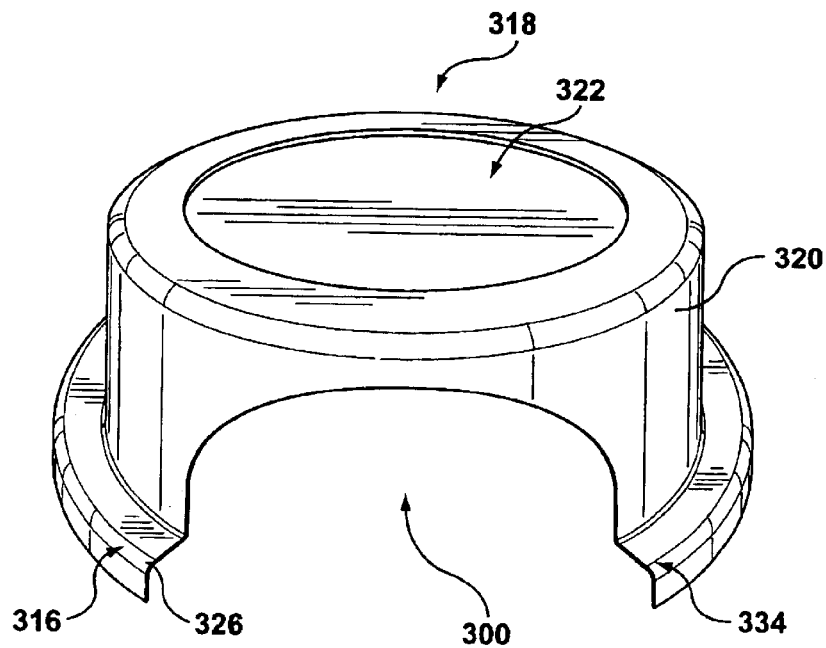
FIG. 22 is a perspective view of the scoop and litter container of FIG. 21 with a cover thereon.
Figure 23:
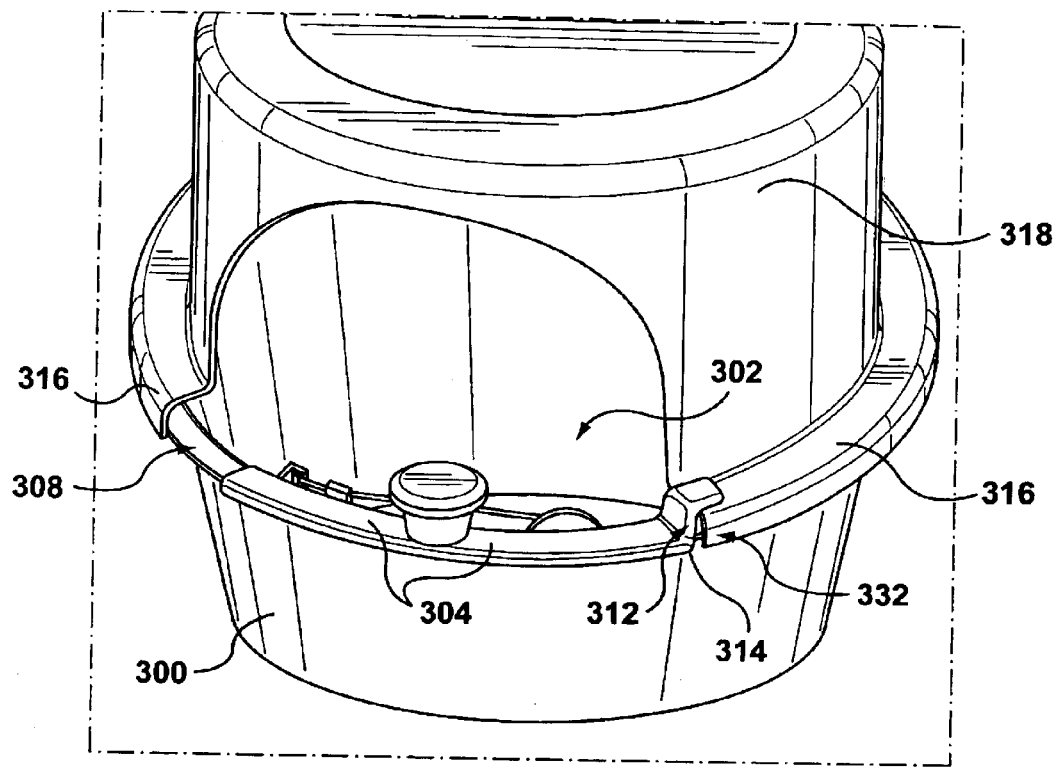
FIG. 23 is a perspective view of a portion of the cover of FIG. 22.
Figure 24:
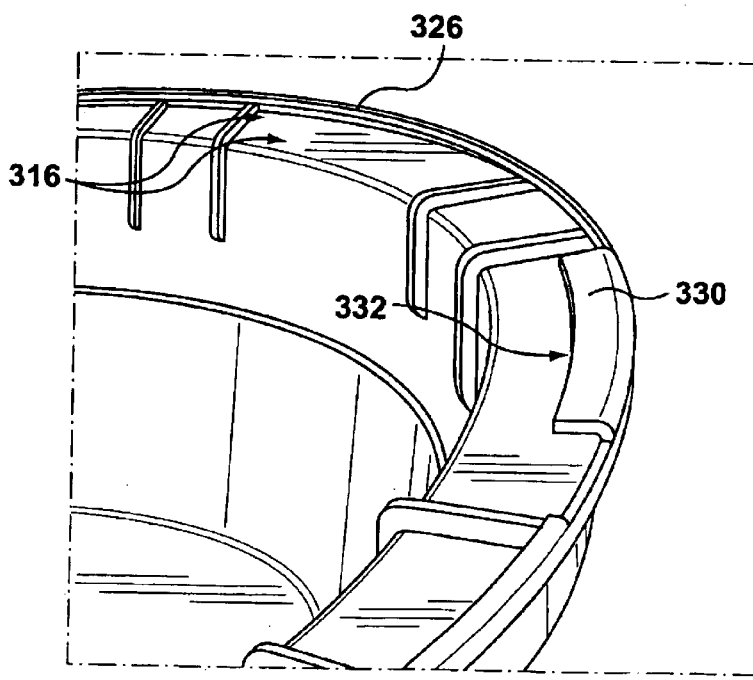
FIG. 24 is a perspective view of the inside of the cover.

FIGS. 22 to 24 show the cover 318 for the litter container 300. The cover 318 includes a circular sidewall 320 approximately 8 inches in height. The cover 318 also includes a horizontal top wall 322 that is molded to the top of the circular sidewall 320. The diameter of the circular sidewall 320 is approximately 17-¾ inches at the bottom. Extending outwardly from the bottom of the cover 318 is a horizontally protruding rim 316 that extends outwardly by approximately 1 inch. The protruding rim 316 includes a vertical wall 326 that extends downwardly, from the edge of the protruding rim 316, by a distance of approximately ¾ inch. One function of the protruding rim 316 is for mounting and supporting the cover 318 in position on top of the litter container 300, as will later be described. The protruding rim 316 sits on top of the extending lip 308 of the litter container 300.

The protruding rim 316 does not run continuously around the circular sidewall 320 of the cover 318. The protruding rim 316 has a break that corresponds to, and is part of, an opening 328 cut out from the side of the circular sidewall 320. This opening 328 is approximately 7 inches high and is used as an entry and exit point for a cat to get in and out of the litter container 300, when the cover 318 is mounted on top of the litter container 300. The break, or width of the opening 328, in the protruding rim 316 is approximately 12 inches long, which is approximately 2 inches longer than the top of the sidewall slider 304.

FIG. 24 shows a portion of the protruding rim 316 of the rear of the cover 318, opposite the opening 328, which is the front of the cover 318. As shown, a horizontal cover-securing member or flange 330 extends horizontally and inwardly from the vertical wall 326 of the protruding rim 316. This cover-securing member 330 runs approximately 4 inches long along the vertical wall 326 of the protruding rim 316 and extends inwardly by approximately ¼ inch. Together, the protruding rim 316, vertical wall 326 and horizontal cover-securing member 330 create a joint 332. This joint 332 helps secure the cover 318 on the litter container 300 as will next be described.

In normal use, and for scooping, the cover 318 is mounted on top of the litter container 300. To mount the cover 318, the cover 318 is first oriented above the litter container 300 such that the opening 328 of the cover 318 corresponds to, and is held slightly above, the sidewall slider 304. The joint 332 of the cover 318 is lowered and moved radially over the extending lip 308 of the litter container 300. The front of the cover 318 is then lowered so that the rim 316 of the cover 318 rests on the extending lip 308 of the litter container 300. As the front of the cover 318 is lowered the opening 328 of the cover 318 lowers over the sidewall slider 304 and the cover-locking tab 312 of the sidewall slider 304. As the cover 318 is mounted on the litter container 300, the vertical wall 326 of the rim 316 extends downwardly and over the extending lip 308 of the container. The snug fit of the vertical wall 326 over the extending lip 308 ensures the cover 318 will not have horizontal motion relative to the litter container 300.

To further secure the cover 318 to the litter container 300, the cover 318 may be rotated slightly clockwise, such that the leading edge 334 of the horizontal portion of the rim 316 of the cover 318 slides under the cover-locking tab 312 of the sidewall slider 304. At this point vertical upward motion of the cover 318 is constrained by the cover-locking tab 312 and by the joint 332, which has received the extending lip 308 of the litter container 300. Horizontal motion of the cover 318 atop the litter container 300 is constrained by the vertical wall 326, which now extends downwardly over the extending lip 308 of the litter container 300. The cover 318, however, may be rotated in place on top of the litter container 300.

Next described is how the cover is used to rotate the scoop unit 302.

Once the cover 318 has been mounted on the litter container 300, the scoop unit 302 is then inserted through the opening 328 of the cover 318 and mounted onto the sidewall slider 304. The cover 318 is then grasped by the user and rotated clockwise, which corresponds to the direction the scoop unit 302 is normally rotated for scooping. (A handle can be placed on cover 318 if desired, or the cover can simply be gripped in any desired way.) As the cover 318 is rotated, the leading edge 334 of the rim 316 of the cover 318 abuts against the trailing end 314 of the sidewall slider 304 and pushes the sidewall slider 304 along the container sidewall 306. The scoop unit 302 moves with the sidewall slider 304 and moves through the litter in the litter container 300 and captures waste. The cover 318 needs to be rotated by 360 degrees at least once to cause the scoop unit 302 to pass through all the litter in the litter container 300. The user may then stop rotating the cover 318. The scoop unit 302 can now be removed from the sidewall slider 304 and taken out through the opening 328 of the cover 318. Waste that has been captured by the scoop unit 302 may now be disposed of.

The foregoing discussions and embodiments are presented as illustrative and should not be taken as limiting. Other variations within the spirit and scope of this invention are possible and will present themselves to those skilled in the art.

I claim:

1. A circular litter container comprising:
   (a) a sidewall;
   (b) a scoop holder mounted on said sidewall for travel in a direction of travel around said sidewall;
   (c) a scoop;
   (d) a mounting mechanism for removably mounting said scoop on said scoop holder;
   (e) said mounting mechanism comprising cooperating mounting means on said scoop and said scoop holder for said scoop to have an operating position in which said scoop is oriented at a first angle relative to said direction of travel in which said scoop may be rotated through litter in said container while minimizing formation of a wave of litter piled in front of said scoop;
   (f) said cooperating mounting means including a guide such that as said scoop is removed from said scoop holder, the orientation of said scoop is redirected to a second angle nearer to the horizontal than said first angle, whereby to help retain collected waste on said scoop; and
   (g) said scoop including a rear portion in said cooperating mounting means including a plug and socket removably connecting said rear portion of said scoop to said scoop holder.

2. A litter container according to claim 1 wherein said plug and socket means includes a substantially circular socket mounted on said scoop holder and a substantially circular plug mounted on said scoop, said plug being rotatable in said socket.

3. A littler container according to claim 2 wherein said scoop has a front portion and said cooperating mounting means include a removable connection between said front portion of said scoop and said scoop holder, whereby said front portion of said scoop may be lifted upwardly relative to said scoop holder.

4. A circular litter container comprising:
    (a) a sidewall;
    (b) a scoop holder mounted on said sidewall for travel in a direction of travel around said sidewall;
    (c) a scoop;
    (d) a mounting mechanism for removably mounting said scoop on said scoop holder;
    (e) said mounting mechanism comprising cooperating mounting means on said scoop and said scoop holder for said scoop to have an operating position in which said scoop is oriented at a first angle relative to said direction of travel in which said scoop may be rotated through litter in said container while minimizing formation of a wave of litter piled in front of said scoop;
    (f) said cooperating mounting means including a guide such that as said scoop is removed from said scoop holder, the orientation of said scoop is redirected to a second angle nearer to the horizontal than said first angle, whereby to help retain collected waste on said scoop; and
    (g) said cooperating mounting means comprising a track associated with one of said scoop and said scoop holder, and a guide piece associated with the other of said scoop and said scoop holder and movable within said track.

5. A litter container according to claim 4 wherein said track is curved.

6. A circular litter container comprising:
    (a) a sidewall;
    (b) a scoop holder mounted on said sidewall for travel in a direction of travel around said sidewall;
    (c) a scoop;
    (d) a mounting mechanism for removably mounting said scoop on said scoop holder;
    (e) said mounting mechanism comprising cooperating mounting means on said scoop and said scoop holder for said scoop to have an operating position in which said scoop is oriented at a first angle relative to said direction of travel in which said scoop may be rotated through litter in said container while minimizing formation of a wave of litter piled in front of said scoop;
    (f) said cooperating mounting means including a guide such that as said scoop is removed from said scoop holder, the orientation of said scoop is redirected to a second angle nearer to the horizontal than said first angle, whereby to help retain collected waste on said scoop; and
    (g) said container having a bottom and said scoop holder including a scraper bar mounted to scrape said bottom as said scoop holder is rotated in said container.

7. A circular litter container comprising a bottom, a sidewall encircling said bottom, a scoop holder mounted on said sidewall for travel around said sidewall, a scoop removably mounted in said scoop holder, and a scraper connected to said scoop holder for scraping said bottom of said container.

8. A litter container according to claim 7 wherein said scraper is pivotally connected to said bottom of said container for rotary movement about said container.

9. A circular litter container having a circular sidewall having an upper rim, a scoop holder mounted in said container for rotary movement in said container, a scoop removably mounted in said scoop holder, a cover removably mounted on said rim and rotatable on said rim, said cover having an opening therein, and connecting means for disengagably connecting said cover and said scoop holder such that rotation of said cover will rotate said scoop holder within said container.

10. A litter container according to claim 9 wherein said opening in said cover is adjacent said scoop holder.

11. A litter container according to claim 10 and having a bottom, and wherein said scoop holder includes a scraper bar for scraping said bottom.

12. A litter container according to claim 11 and including cooperating means associated with said scoop and said scoop holder for redirecting the orientation of said scoop from a first angle to a second angle when said scoop is removed from said container, said second angle being closer to the horizontal than said first angle.

13. A circular litter container comprising:
    (a) a sidewall;
    (b) a scoop holder mounted on said sidewall for travel in a direction of travel around said sidewall;
    (c) a scoop;
    (d) a mounting mechanism for removably mounting said scoop on said scoop holder;
    (e) said mounting mechanism comprising cooperating mounting means on said scoop and said scoop holder for said scoop to have an operating position in which said scoop is oriented at a first angle relative to said direction of travel in which said scoop may be rotated through litter in said container while minimizing formation of a wave of litter piled in front of said scoop;
    (f) said cooperating mounting means including a guide such that as said scoop is removed from said scoop holder, the orientation of said scoop is redirected to a second angle nearer to the horizontal then said first angle, whereby to help retain collected waste on said scoop; and
    (g) said scoop including a first sieve having openings of a predetermined size, and further including a second sieve attachable to said first sieve and adapted to cover said first sieve creating a finer screen for litter than either of said first and second sieves separately.

* * * * *